US010056783B2

(12) United States Patent
Johnson

(10) Patent No.: US 10,056,783 B2
(45) Date of Patent: Aug. 21, 2018

(54) INTEGRATED CIRCUIT ENERGY RECOVERY AND HEAT REDUCTION

(71) Applicant: Johnson Research and Development Co., Inc., Atlanta, GA (US)

(72) Inventor: Lonnie G. Johnson, Atlanta, GA (US)

(73) Assignee: Johnson Research & Development Co., Inc., Atlanta, GA (US)

( * ) Notice: Subject to any disclaimer, the term of this patent is extended or adjusted under 35 U.S.C. 154(b) by 181 days.

(21) Appl. No.: 14/676,171

(22) Filed: Apr. 1, 2015

(65) Prior Publication Data

US 2015/0295419 A1 Oct. 15, 2015

Related U.S. Application Data

(60) Provisional application No. 61/973,465, filed on Apr. 1, 2014.

(51) Int. Cl.
| G11C 5/14 | (2006.01) |
|---|---|
| H02J 50/10 | (2016.01) |
| H02J 7/34 | (2006.01) |
| H02J 7/02 | (2016.01) |
| H02J 50/12 | (2016.01) |
| H02J 7/00 | (2006.01) |

(52) U.S. Cl.
CPC .............. *H02J 50/10* (2016.02); *H02J 7/025* (2013.01); *H02J 7/345* (2013.01); *H02J 50/12* (2016.02); *H02J 2007/0059* (2013.01)

(58) Field of Classification Search
CPC .......... G11C 5/142; G11C 11/48; G11C 17/02
USPC ................................................. 365/226-229
See application file for complete search history.

(56) References Cited

U.S. PATENT DOCUMENTS

| 5,469,399 | A | * | 11/1995 | Sato ........................ G11C 5/145 327/530 |
|---|---|---|---|---|
| 5,760,456 | A | | 6/1998 | Grzegorek et al. |
| 2010/0019300 | A1 | | 1/2010 | Yu et al. |
| 2014/0153294 | A1 | * | 6/2014 | Deboy .............. H02M 3/33569 363/21.04 |
| 2015/0180355 | A1 | * | 6/2015 | Freeman ................. H02M 1/08 363/21.04 |
| 2016/0308429 | A1 | * | 10/2016 | Yeh ........................... H02P 9/00 |

* cited by examiner

*Primary Examiner* — Han Yang
(74) *Attorney, Agent, or Firm* — Panitch Schwarze Belisario & Nadel LLP

(57) ABSTRACT

An energy harvesting circuit for use with a logic circuit includes an induction coil positioned near conductive elements of the logic circuit and configured to extract energy from the magnetic fields produced by transient currents associated with state changes within the logic circuit.

4 Claims, 6 Drawing Sheets

(Prior Art)

INTEGRATED CIRCUIT ENERGY RECOVERY AND HEAT REDUCTION

CROSS-REFERENCE TO RELATED APPLICATIONS

This application claims priority to U.S. Provisional Patent Application No. 61/973,465, filed on Apr. 1, 2014, entitled "Integrated Circuit Energy Recovery and Heat Reduction," the entire contents of which are incorporated by reference herein.

BACKGROUND OF THE INVENTION

State of the art microprocessors circuits are dramatically increasing in power consumption and power density as functional requirements continue to drive circuit complexity. Microprocessor power consumption is emerging as the greatest problem facing designers of computer systems. Not only does the electrical circuitry itself have to be designed for operation at high levels of power consumption and elevated temperature, but designers also have to address overall system level mechanisms for dissipating large amounts of heat. Increases in operating temperature cause increases in power consumption, which can result in further temperature increases, leading to further power consumption and so on, creating a self-reinforcing undesirable scenario. Elaborate cooling system designs, including the use of heat pipes as well as active refrigeration based cooling systems, are routinely employed to maintain logic circuitry within desired operating temperature ranges. As a result, very high power bills are often associated with the operation of computers and the cooling systems they require. The requirement for microprocessor power dissipation increases the cost of cooling and packaging design, reduces system reliability, complicates power supply circuitry design, and reduces battery lifetime. Power consumption and the need for cooling often also impact geographical location decisions for deployment of large computer complexes.

Computer circuits can be viewed as entropy machines. Although computer circuits consume large amounts of power, they do not perform actual work. The electrical power input is converted into heat. It is therefore desirable to provide a way to recover a significant portion of the electrical energy used to operate computer logic circuitry and thereby reduce the power needs of the computer and, at the same time, the amount of heat generated.

BRIEF SUMMARY OF THE INVENTION

An embodiment of the present invention comprises an energy harvesting circuit for use with a logic circuit. The energy harvesting circuit includes an induction coil positioned near conductive elements of the logic circuit and configured to extract energy from the magnetic fields produced by transient currents associated with state changes within the logic circuit.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
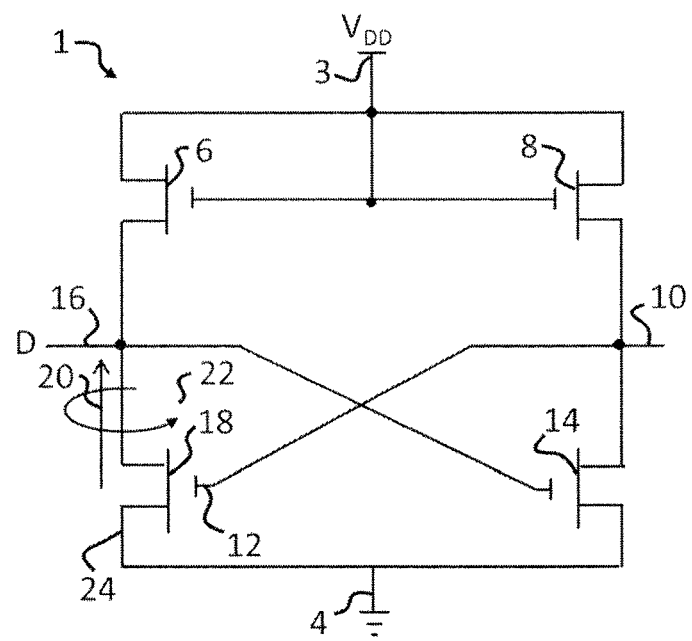
FIG. 1 is schematic view of a memory cell that is representative of circuits used in present logic circuitry for use with certain preferred embodiments of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the device and designated parts thereof. Unless specifically set forth herein, the terms "a", "an" and "the" are not limited to one element but instead should be read as meaning "at least one". The terminology includes the words noted above, derivatives thereof and words of similar import.

Figure 2:
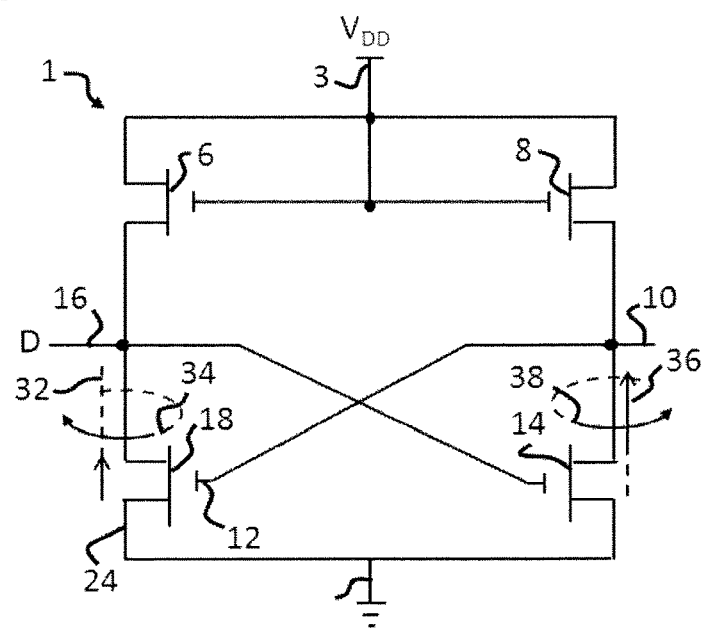
FIG. 2 is a schematic view of the memory cell of FIG. 1.

Referring to FIGS. 1 and 2, a single memory cell 1 representative of circuits may be employed in computer logic circuitry is shown. This particular circuit is commonly known as a "D flip flop" and consists of four MOS transistors, with two of the transistors 6 and 8 being the active loads and the remaining two transistors 14 and 18 being the switches. Line 10 is the output and line 16 is the input. In such circuits, a low voltage state, near ground voltage 4, represents a "0" and a high voltage state, near $V_{DD}$, represents a "1". The active load transistors 6 and 8 are connected to voltage source $V_{DD}$. Designation of a given transistor's electrode as a "drain" or "source" depends on whether the transistors are of the NMOS or PMOS type. This distinction is, however, not critical in conveying the essential elements of this disclosure. Thus, "drain" and "source" are understood to be interchangeable as the designation in an actual circuit will depend on the type of transistor used.

The gates of the active load transistors 6 and 8 are coupled to voltage source $V_{DD}$ as well. This configuration biases the active load transistors 6 and 8 to an on state at a nominally low current. The source of active load transistor 6 is coupled to a drain 24 of switch transistor 18 and to output 16. When switch transistor 14 is in an off state, line 10 is pulled to a high voltage state by active load transistor 8. On the other hand, when switch transistor 14 is turned on, its impedance is low compared to the impedance of active load transistor 8. As a result, output line 10 is pulled to a low voltage state. Operation of active load transistor 6 and switch transistor 18 is very similar to that of active load and switch transistors 8 and 14. The drain of switch transistor 18 is connected to the source of active load transistor 6. When switch transistor 18 is in an on, high conducting state, line 16 is maintained in a low voltage state. Turning switch transistor 18 off allows active load transistor 6 to pull line 16 to a high voltage, i.e. "1."

In the configuration represented in FIG. 1, the input D, line 16, is set at zero. Because of the low voltage at its gate, switch transistor 14 is in an off state. The resulting high state of output line 10 biases transistor 18 to an on state as high voltage is applied to its gate, 12. The current passing through transistor 18 generates magnetic field 22. In this example state, a "1" has been be written to output 10 by applying a "0", i.e. low voltage, to input 16. When a "0" is applied to input 16, it causes output 10 to be driven to "1", i.e. a high voltage state. Input 16 is connected to the source of active load transistor 6 and the drain of switch transistor 18. It is also coupled to the gate of switch transistor 14. When line 16 is moved towards a low voltage state, a "0", it causes the gate of switch transistor 14 to turn off, resulting in reduced current flow there through which allows line 10 to rise toward the voltage of $V_{DD}$. Line 10 is coupled to the gate of switch transistor 18 such that its increasing voltage causes transistor 18 to turn on. The increased current flow through transistor 18 accelerates the movement of line 16 to a low voltage state further assisting in the turn off of transistor 14 and thereby movement of line 10 toward high voltage, "1". This positive feedback is symmetric in the circuit such that the feedback causes the cell to change its state very rapidly once a state change has been initiated in either direction, "1" or "0".

As represented in FIG. 1, current flowing in direction 20 through the conductive pathway formed by switch transistor 18 when in an on state generates magnetic field 22. As represented in FIG. 2, a rapid change in output state from "1" to "0" generates a rapid change in the magnetic fields surrounding the conductive pathways in the circuit as switch transistor 18 turns off and switch transistor 14 turns on. It is significant that the directions of change in the magnetic fields generated with a change in state of the memory cell are additive. As switch transistor 18 turns off, the decreasing current generates a decreasing magnetic field. The magnetic field's direction of change is as illustrated by arrow 34. Similarly, as switch transistor 14 turns on, the increasing current generates a changing magnetic field having a direction of change as illustrated by arrow 38. The geometry of the schematic diagram does not necessarily represent the geometry of an actual memory cell. However, the critical point is that changes in state of logic circuitry in computer processors generate magnetic flux changes. Generally computer logic circuits are clocked at very high speeds, e.g., in the Mega Hertz to Giga Hertz range. The resulting high frequency electromagnetic fields represent a source of noise that can have adverse impacts on the operational performance of the overall logic circuitry.

Figure 3:
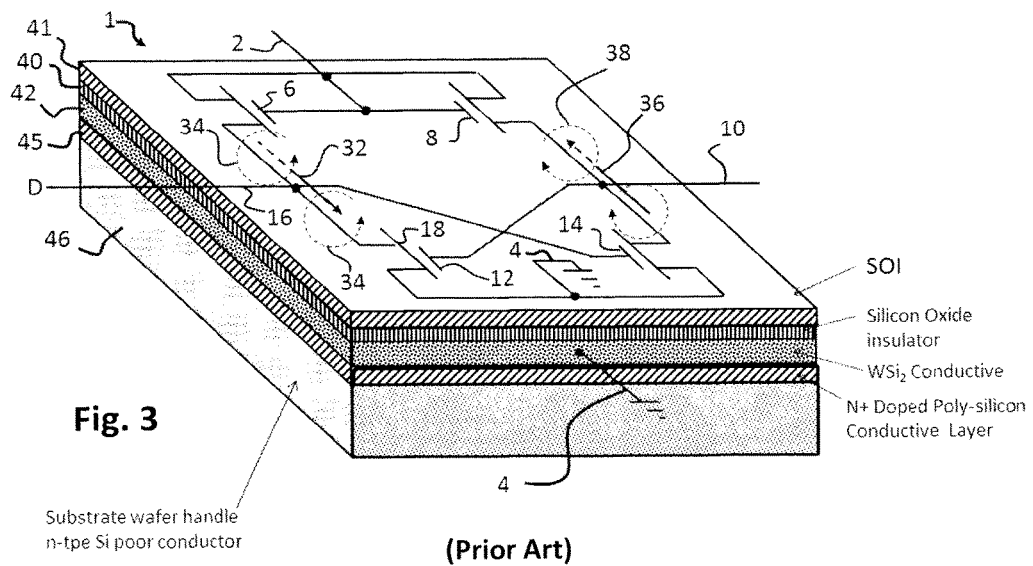
FIG. 3 is a partial schematic perspective view of the memory cell of FIG. 1 on a substrate and including a ground plane.
Figure 4:
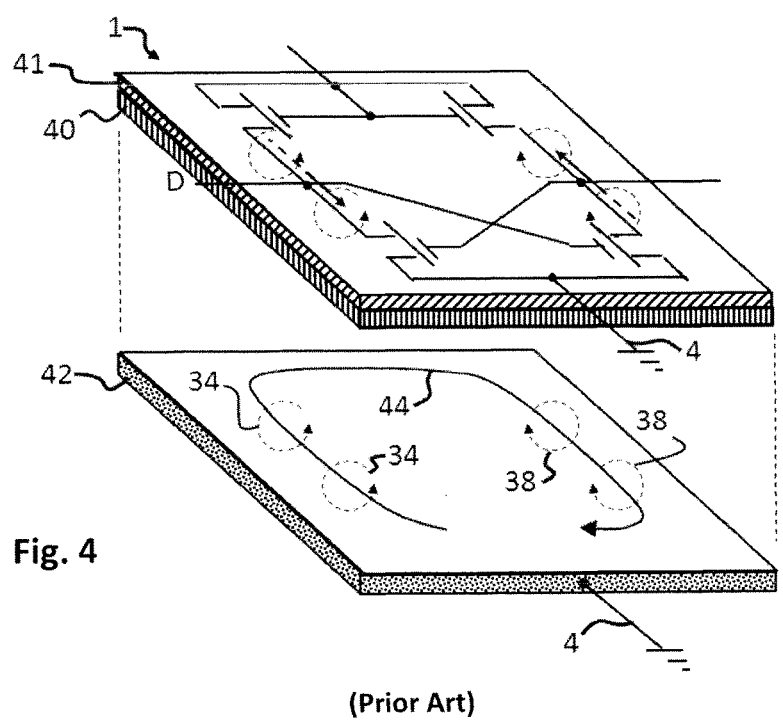
FIG. 4 is an exploded partial schematic perspective view of the memory cell and ground plane of FIG. 3.

Ground planes may be used in computer microprocessor circuits to suppress noise from both internal and external sources. FIG. 3 illustrates a ground plane 42 positioned under the memory cell 1 shown in FIGS. 1 and 2. The ground plane 42 is preferably made from a conductive or semiconductive material, most preferably tungsten disilicide ($WSi_2$), although other types materials may be used as well. In this particular example, the ground plane 42 is insulated from a silicon integrated circuit layer 41 by an insulator layer 40. The use of ground planes is very common in many circuits. The ground plane 42 may be underneath, above or even located in the same plane with the logic circuitry. In FIGS. 3 and 4, for example, the memory cell 1 is formed on a silicon integrated circuit layer 41, which is mounted atop a buffer oxide (BOX) insulation layer 40, which is on top of the ground plane 42. In this particular example, the ground plane 42 is on top of a poly-silicon layer 45. The poly-silicon is preferably conductive n-type, although other doping concentrations and doping types (e.g., p-type) may be used as well. In the example of FIG. 3, the poly-silicon layer is a relatively n+ doping concentration. The series of layers in FIG. 3 are mounted on a silicon handle wafer 46 acting as a substrate. The handle wafer 46 is preferably of n-type silicon and is preferably a poor conductor. Ground planes are particularly important for suppressing magnetic field noise produced by circuit state transitions during normal processor operation. The intent is to eliminate inductive couplings among circuit components so that the noise does not induce unintended state changes within the logic circuitry.

The above-described scheme and the remainder of the description in this application is equally applicable to complementary MOS (CMOS) logic circuitry with minor modifications related to the CMOS current directions during the transients.

In silicon-on-insulator (SOI) or silicon-on-sapphire (SOS) devices may or may not include a specified ground plane. However, in such applications, the buffer oxide (BOX) insulation layer 40 may still be present. The BOX layer 40 provides more efficient capacitive isolation of the MOS transistors from the bulk silicon handle wafer substrate 46. The magnetic field related ground plane benefits may be restored by placing a metallically conductive layer 45 at the boundary between the BOX substrate 40 and bulk silicon substrate 46. The metallically conductive layer 45 may be fabricated by a number of techniques such as ion implantation, for example.

Addition of the ground plane will not modify the logic functionality of the MOS transistor circuits because the mostly magnetic coupling affects only the switching transient characteristics, not the DC states of the transistors, which determine the logic functionality. Benefits of reduced heating of the logic circuits are anticipated to outweigh possible slowing down of the switching transients due to the presence of the ground plane.

For illustrative purposes, FIG. 4 shows an expanded view of the ground plane underneath the memory cell 1. In this and the following examples, a highly electrically conductive ground plane is preferably fabricated at the interface between the BOX layer 40 and the bulk Si substrate 46 (not shown in FIG. 4) in the SOI/SOS configurations with the insulation layer 40 separating the ground plane 42 from the integrated circuit layer 41. The conductive n-type poly-silicon layer 45 located between the bulk silicon substrate 46 and the ground plane 42 is optional. As depicted in the drawing, the changing magnetic fields 34 and 38 produced by the changing current 32 and 36 in the memory cell induce eddy current 44 within the ground plane 42. Energy is lost from magnetic fields 34 and 38 as eddy current is induced in the ground plane 42 whereby the radiated energy is converted into heat. This loss of energy limits the ability of the radiated fields to impact other components of the logic circuitry.

Figure 5:
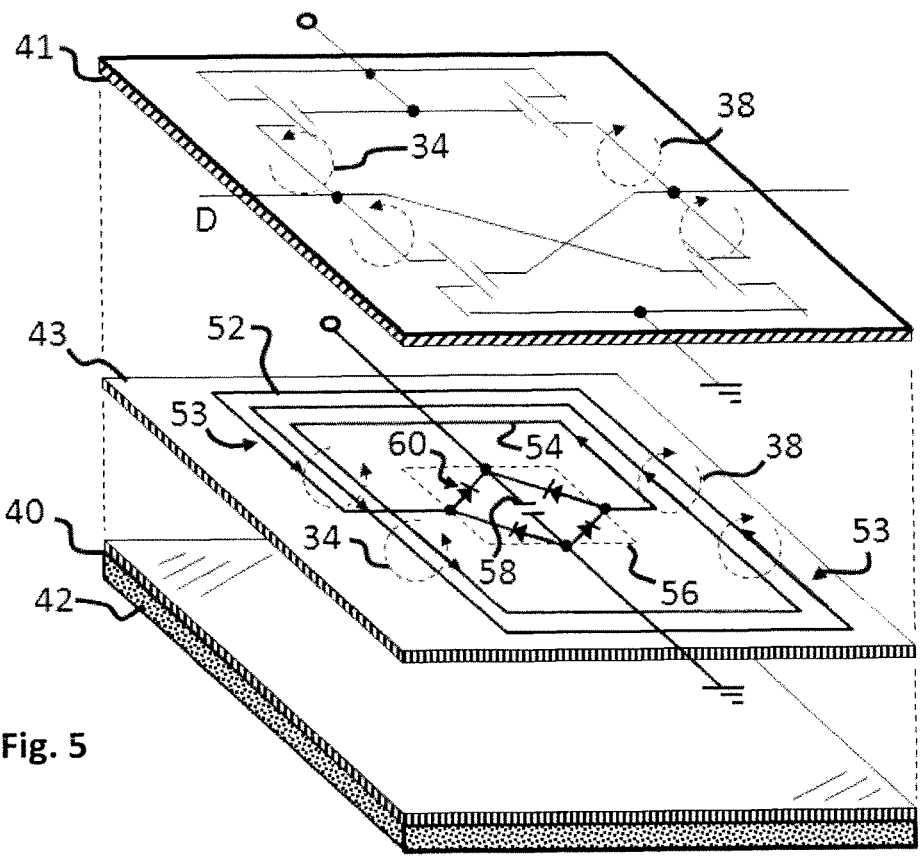
FIG. 5 is a partial schematic exploded perspective view of the memory cell of FIG. 1 with a circuit according to a first embodiment of the present invention.

In accordance with an embodiment of the present invention, FIG. 5 shows the addition of a substrate layer 43 having an energy harvesting circuit 52 mounted thereon. The substrate layer 43 is preferably made of silicon. The substrate 43 may be attached on top of (e.g., FIG. 5) and/or used in place of (e.g., FIG. 6) the ground plane 42. Substrate layer 43 is non-conductive and therefore not susceptible to eddy currents. The circuit 52 includes an induction coil 54, a filter/energy storage capacitor 58, and a bridge rectifier circuit 56 including diodes 60 (and may include additional power conditioning circuitry (not shown)). The circuit 52 is preferably built on a silicon coating 43 on top of the BOX layer 40 to provide the energy harvesting in SOI/SOS configurations. Operation is such that an electric current is induced in the coil 54 each time the memory cell 1 changes its output state. Coil 54 is positioned near the conductive elements of the memory cell 1 and configured to extract energy from the magnetic fields produced by current flowing through the conductive elements of the memory cell 1. The changes in current that occur in the memory cell 1 as switch transistors 14 and 18 switch on and off produce magnetic flux transients that couple the energy to coil 54. The number of loops or turns in the coil 54 is sufficient to produce a voltage that is higher than the voltage across the conductive elements within the memory cell 1. The number of loops is selected to achieve a voltage that is sufficiently high to couple energy back to the power source $V_{DD}$.

Figure 6:
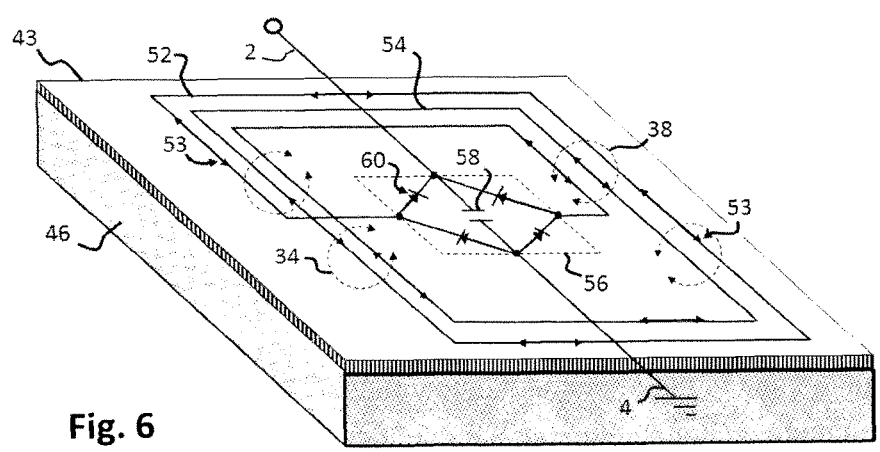
FIG. 6 is a partial schematic perspective view of the memory cell of FIG. 1 integrated with a circuit according to a second embodiment of the present invention.

As further illustrated in FIGS. 5 and 6, repeated changes in state of the memory circuit between "1" and "0" produce alternating magnetic fields 34 and 38, which induce alternating current in the coil 54, as represented by arrows 53. Diodes 60 form full wave bridge rectifier 56. The rectifier 56 converts the alternating current induced in the coil 54 into direct current, which is in turn supplied to a capacitor 58. The capacitor 58 functions as a filter for suppressing peak voltage transients in the DC voltage supplied by the rectifier 56. The capacitor 58 is coupled between $V_{DD}$ and ground, lines 2 and 4 respectively, such that energy induced in the coil 54 is supplied back to the source $V_{DD}$. Thus, energy that would normally be dissipated as heat in the ground plane 42 is harvested as electrical energy and coupled back to the power source.

Figure 7:
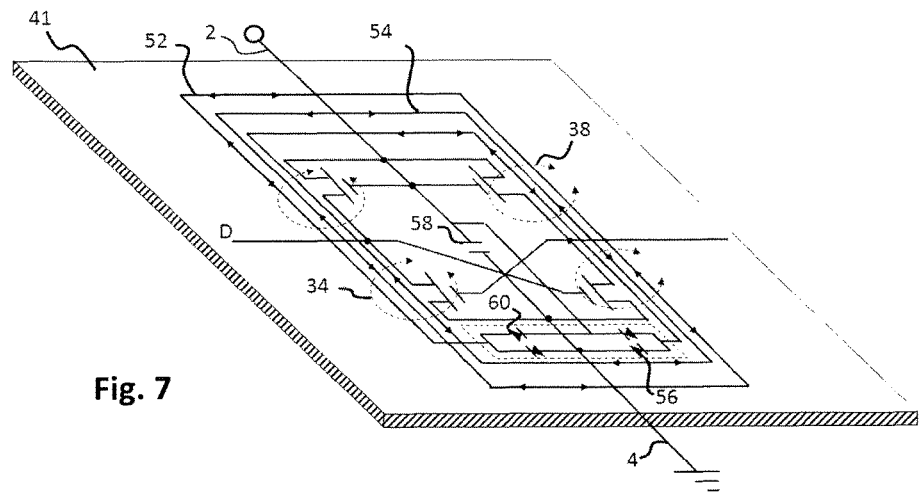
FIG. 7 is a partial schematic perspective view of the memory cell of FIG. 1 integrated with a circuit according to a third embodiment of the present invention.

As represented by FIG. 6, coil 54 may be designed to extract EMF energy in an amount that suppresses circuit noise to a level that enables the elimination of the ground plane 42. FIG. 7 shows the energy harvesting circuit 52 mounted in the same layer 41 as the memory cell 1, thereby eliminating the need for the separate layer 43.

Figure 8:
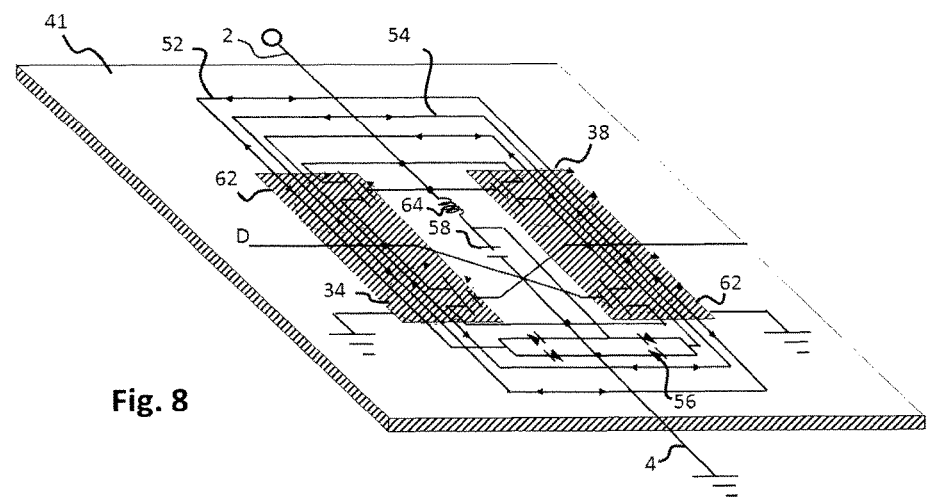
FIG. 8 is a partial schematic perspective view of the structure of FIG. 7 with highly magnetically permeable material added in accordance with a fourth embodiment of the present invention.

FIG. 8 includes material 62, such as ferrite and/or nickel based materials or other like materials, having high magnetic permeability positioned near the coil 54 and the conductive elements of the memory cell 1. The material 62 improves concentration of the magnetic fields in order to better couple energy from the memory cell 1 to the coil 54 during current transients associated with changes in memory state. FIG. 8 further includes inductive choke coil 64. The choke coil 64 is positioned between the energy harvesting circuit 52 and the power input line 2, i.e., $V_{DD}$, and functions to isolate voltage transients that are generated across the capacitor 58 as the capacitor 58 is periodically charged by voltage transients from the coil 54. As such, the choke coil 64, the capacitor 58, and the rectifier 56 comprise power conditioning circuitry for coupling energy recovered by the coil 54 to the power supply to replenish the supply or to supplement energy being supplied therefrom.

Figure 9:
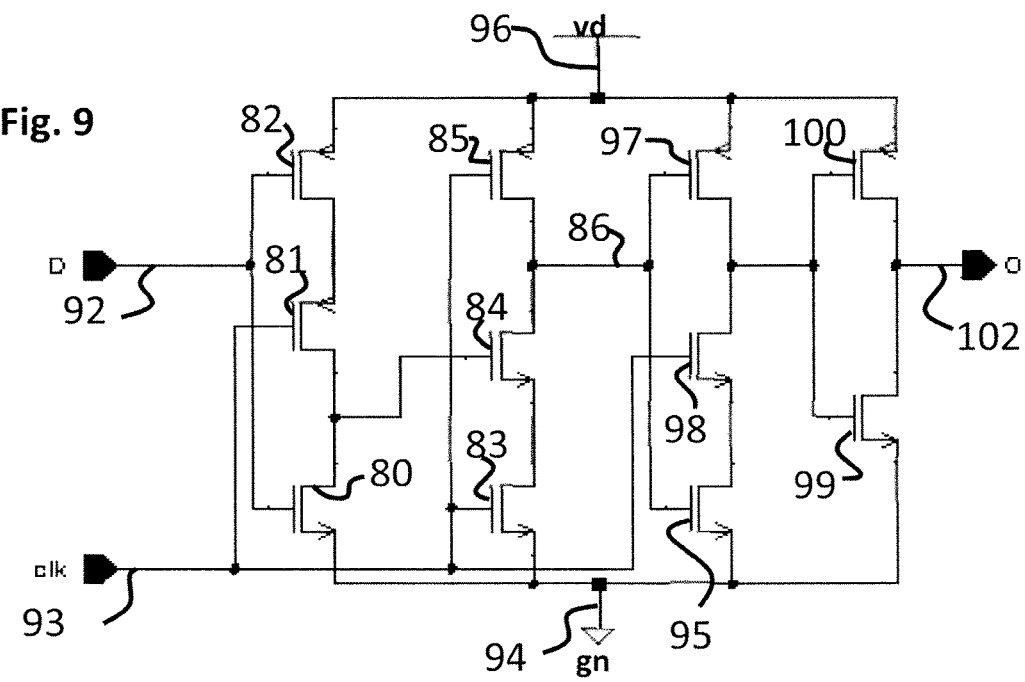
FIG. 9 is a schematic of a flip-flop cell for use with certain preferred embodiments of the present invention.

An alternate embodiment of the invention is shown in conjunction with FIG. 9, which is a representative example of a CMOS D type flip flop coupled between $V_{DD}$ 96 and ground 94. Transistors 95 and 97 are CMOS transistors configured to drive output CMOS transistors 99 and 100 to a state determined by the high or low state of "D" circuit input 92. The gates of transistors 99 and 100 are driven to a state determined by the state of input "D" 92 when a positive transient of clock input line 93 occurs. During a change of state of output 102, both transistors 99 and 100 are in an on state. If the transition is from high to low, then transistor 100 will be transitioning to an off state and transistor 99 will be transitioning to an on state. During the transition period, both transistors will be on and the current draw will be will transition through a maximum state as current is supplied to or extracted from other circuit components such as logic gates that may be connected to output 102. Recovery of the power loss that occurs during the transition is a feature of the present invention.

At the input, transistor 81 is in an on state when a "0" state exists on clock input 93. A transient on line 92 from "0" to "1" or from "1" to "0", results in transistors 80 and 82 being in an on state during the transient. As such, the current flows through all three transistors 80, 81, 82 in the series during a transient when the clock input 93 is low representing another example of the current flow that is subject to inductive coupling and, thereby, the energy recovery invention as disclosed herein.

When clock input 93 is at "0", the circuit is configured to drive the gate of transistor 84 to the inverted state of input "D" 92. When input "D" 92 is high, transistor 80 is turned on, which pulls line 88 low. The resulting low voltage at the gate of transistor 84 turns the transistor 84 off. On the other hand, when input "D" 92 is low and clock input 93 is low, transistor 84 is turned on because the voltage at the gates of both transistors 81 and 82 will be low. The resulting on states of transistors 81 and 82 pulls line 88 high, turning on transistor 84.

When input "D" 92 is low and the Clock input 93 is high, line 88 is placed in a high impedance state as both transistors 80 and 81 will be in an off state. As such, the charge state of the gate of transistor 84 does not change and the on or off state of transistor 84 that existed prior to the clock input 93 becoming a "1" does not change. If transistor 84 was off because input "D" 92 was high prior to the clock and does not change with the clock, then transistor 84 remains off. Operating in this way, transistor 84 is stabilized in the on or off state that existed prior to the occurrence of a "1" at the clock input 93.

When a "0" is present at the clock input 93, transistor 83 will be off and transistor 85 will be on and a "1" appears at line 86. Under this condition the state of transistor 84 does not matter. However, when transistor 84 is in an on state and the clock input 93 transitions to "1", line 86 will be pulled to "0" as the clock turns transistor 85 off and transistor 83 on. On the other hand, if transistor 84 is off when "1" appears at the clock input 93, the resulting turn off of transistor 85 will have no effect, leaving transistor 86 in the high state that existed prior to the clock. Turn on of the transistor 83 will have no effect since it is isolated by the off state of transistor 84. The net effect is that the gates of transistors 95 and 97 attached to line 86 are stabilized at the "1" or "0" state of input "D" 92 when a "1" appears on clock input 93.

Transistor 98 is off when there is a "0" on clock input 93. If line 86 is at the "1" state when "1" occurs on clock input 93, the resulting on states of 95 and 98 will pull line 87 to "0" and transistor 99 will be turned off and transistor 100 will be turned on, resulting in a "1" at output 102. Similarly, if line 86 is at "0" when the clock appears, line 87 will be at "1" as transistor 97 will be on. Even though transistor 98 will be on with a "1" at the clock input 93, transistor 95 will be off because of the low state of line 86. As such, transistor 95 will isolate line 87 from ground 94, allowing transistor 97 to pull line 87 to "1". A "1" at line 87 turns transistor 99 on and transistor 100 of resulting in a "0" at output 102. Thus if input 92 is high when a clock high occurs, a "1" appears at output 102. On the other hand a "0" on input 92 results in a logical "0" at output 92 when the clock pulse occurs.

Figure 10:
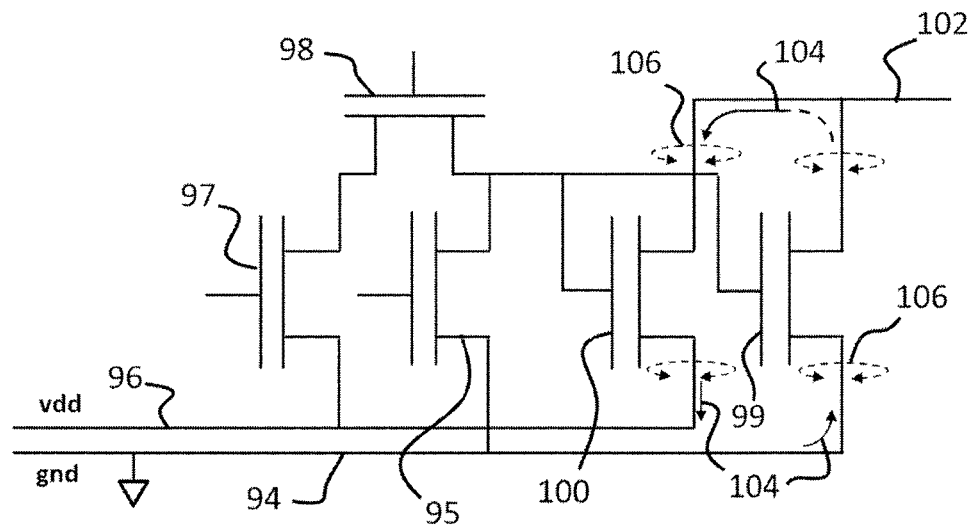
FIG. 10 is a schematic of the flip-flop of FIG. 9 with components arranged to maximize inductive coupling in accordance with certain preferred embodiments of the present invention.
Figure 11:
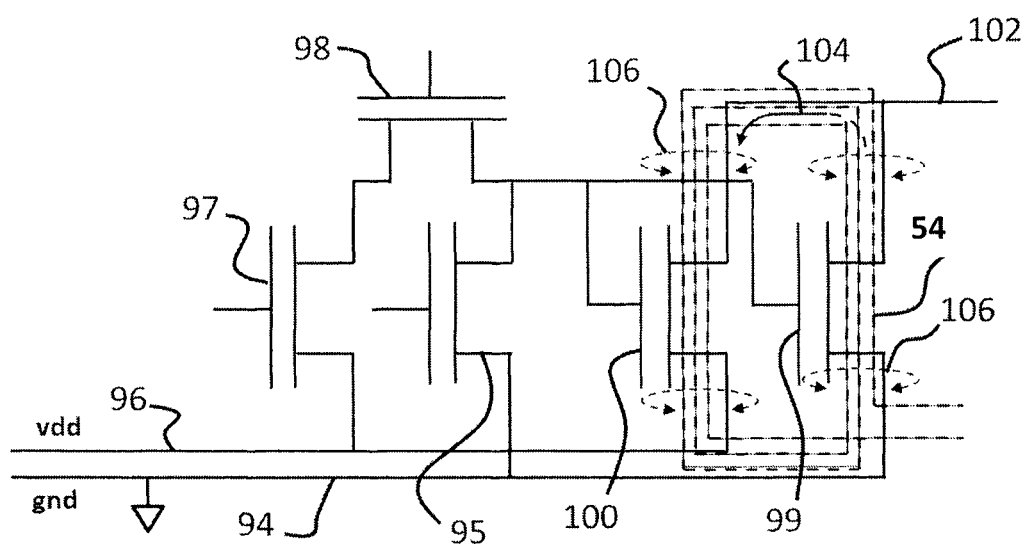
FIG. 11 is a schematic of the flip-flop of FIG. 10 in use with a circuit according to a fifth embodiment of the present invention.

FIG. 10 illustrates a preferred geometric configuration of the output stage of the circuit of FIG. 9. In this configuration, transistors 99 and 100 are arranged to form a current flow loop 104 such that changing magnetic field 106 is produced by the change in current flow that occurs during change of state transients. FIG. 11 shows coil 54 positioned within magnetic field 106 such that current flow is induced in the coil 54. The coil 54 may be coupled to power conditioning circuitry such that the electrical energy induced therein can be coupled back to the energy source, $V_{DD}$ 96, or applied to some other use of benefit to the host circuitry.

It is understood that the memory cell disclosed herein is but one example of the many varied circuits employed computer logic circuitry. It is further understood that many transients routinely occur within computer logic circuitry and that these transients represent a source of energy that can be harvested inductively for resupply back to or supplement the energy drawn from the power source, the full scope of which is covered by the present disclosure.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. An energy harvesting circuit for use with a logic circuit, the energy harvesting circuit comprising:
   an induction coil positioned near conductive elements of the logic circuit and configured to extract energy from the magnetic fields produced by transient currents within the logic circuit occurring with changes in logic state.

2. The energy harvesting circuit according to claim 1, wherein the energy harvesting circuit further includes rectifier circuitry coupled to the induction coil and configured to convert alternating current induced in the induction coil by the magnetic field transients into direct current.

3. The energy harvesting circuit according to claim 2, wherein the energy harvesting circuit further includes an energy storage capacitor coupled to the coil and configured to store the energy rectified by the rectifier circuitry.

4. The energy harvesting circuit according to claim 1, wherein the logic circuitry further includes a power source supplying power to the logic circuitry, the energy harvesting circuit further including power conditioning circuitry configured to condition energy induced in the induction coil and couple the energy to the power source to at least partially supplement power supplied thereby.

* * * * *